ary Examiner—J. Howard Flint, Jr.

United States Patent
Yoshida et al.

[15] 3,685,929
[45] Aug. 22, 1972

[54] PRESS FOR SHAPING AND CURING PNEUMATIC TIRES

[72] Inventors: Shoushi Yoshida, L201 Yamanikage-Mansion 213-30 Daibutsugahira Nishibirana Mikage-cho, Higashinada-ku, Kobe; Atsuaki Iwama, 1014 Ushigoyayama Shinohara, Nada-ku, Kobe; Takashi Odaka, 3-7 Takamaru, Tarumi-ku, Kobe; Tetuo Suda, 13-1 Sakuraguchi-cho, Nada-ku, Kobe, all of Japan

[22] Filed: Oct. 5, 1970
[21] Appl. No.: 78,022

[30] Foreign Application Priority Data

Oct. 6, 1969  Japan .................... 44/80072

[52] U.S. Cl. .................................................. 425/38
[51] Int. Cl. .................................................. B29h 5/02
[58] Field of Search .................................. 18/2 TP

[56] References Cited

UNITED STATES PATENTS 3,012,279  12/1961  Boysen ............... 18/2 TP UX
2,832,991  5/1958   Soderquist ............. 18/2 TP
2,832,992  5/1958   Soderquist ............. 18/2 TP
3,141,191  7/1964   Soderquist ............. 18/2 TP
3,343,208  9/1967   Pacaiarini et al. ...... 18/2 TP
3,222,716  12/1965  Harris ................... 18/2 TP
3,336,630  8/1967   Soderquist ............. 18/2 TP

FOREIGN PATENTS OR APPLICATIONS 964,363  7/1964  Great Britain ............. 18/2 TP Primary Examiner—J. Howard Flint, Jr.
Attorney—Hamilton, Renner & Kenner

[57] ABSTRACT

A press for shaping and curing pneumatic tires having a collapsible bladder controlled by a center mechanism, and having a movable upper mold section and a stationary lower mold section, and having a mechanism for withdrawing a cured tire from the press including an arm device adapted to engage a cured tire suspended from the center mechanism and a drive unit for driving the upper mold section for opening and closing movement of the press and for driving the arm device for removing a cured tire from the center mechanism and discharging the tire from the press.

4 Claims, 6 Drawing Figures

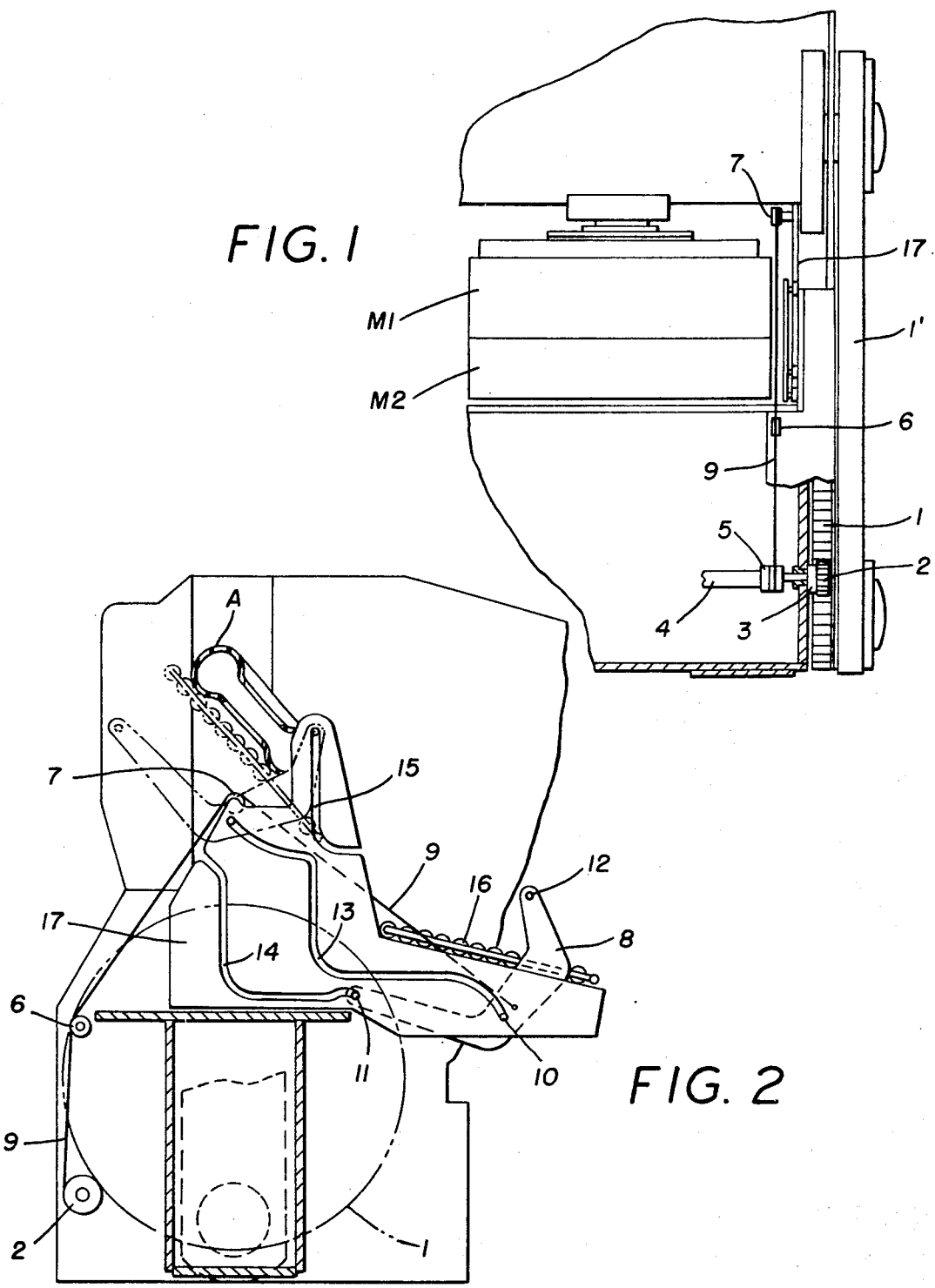

INVENTORS
SHOUSHI YOSHIDA
ATSUAKI IWAMA
BY TAKASHI OKADA
TETUO SUDA

*Hamilton, Cook, Renner & Renner*
ATTORNEYS

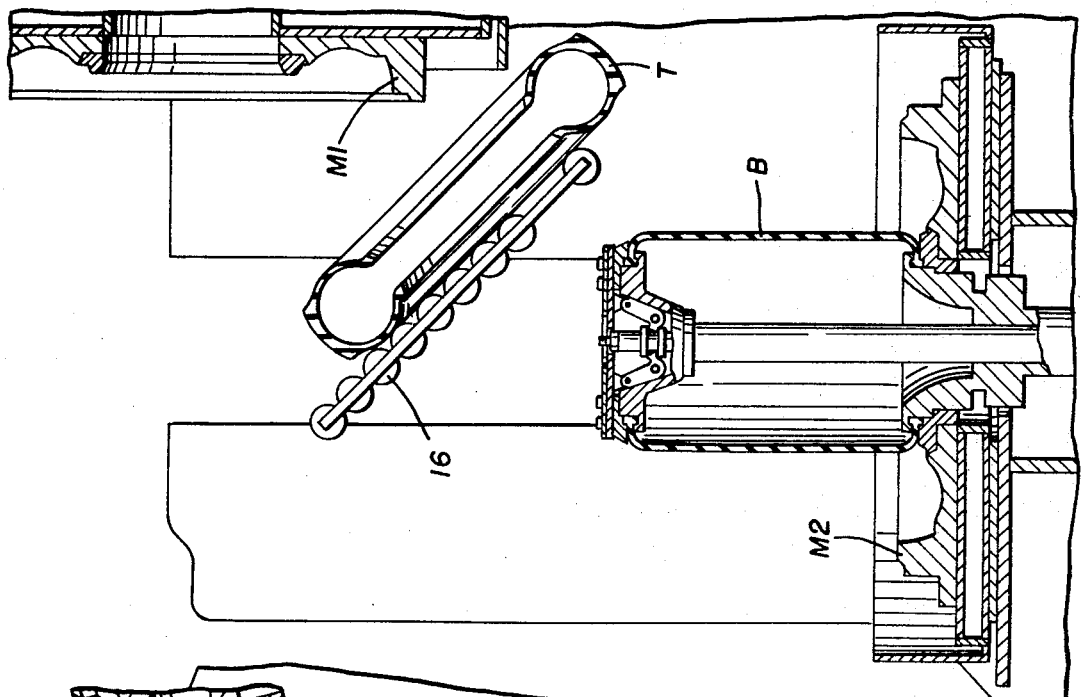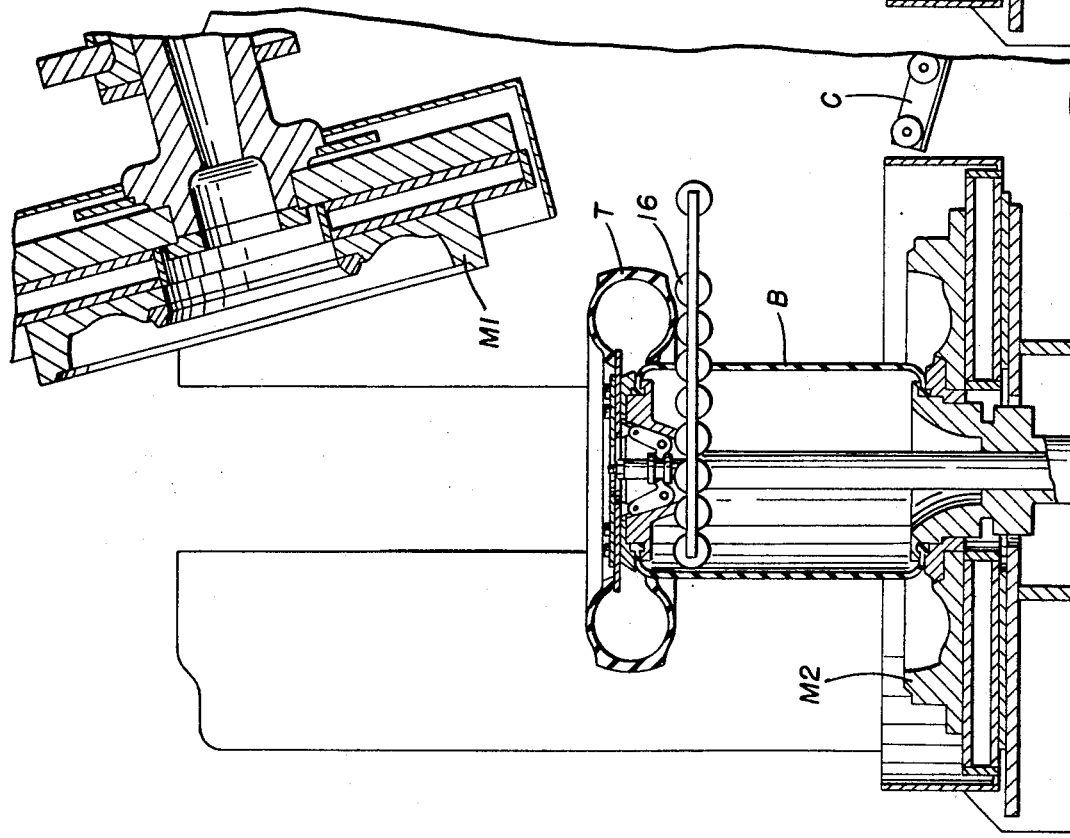

PRESS FOR SHAPING AND CURING PNEUMATIC TIRES

BACKGROUND OF THE INVENTION

The present invention relates to a press for shaping and curing unvulcanized tire bands and more particularly to such a press for shaping and curing tires which ensures the quick and easy withdrawal from the press of a tire which has been shaped and cured by virtue of efficient and economical apparatus.

In a conventional press for shaping and curing tires having a pair of opposed separable or relatively movable mold sections or halves, one upper and the other lower, and a bladder and center mechanism carried by and extending from a mold section and containing primarily a vertical cylinder, it is the usual practice for withdrawal of a cured tire to resort to a suitable separate tire withdrawing mechanism operated by a hydraulic cylinder or motor. In such conventional presses, support of the tire during shaping and curing to maintain the precise configuration of the internal circumference thereof is provided by an elastomeric bladder operated by the center mechanism which serves not only to operate the bladder but also to push the cured tire upwardly stripping it from the lower mold section. After the upper mold section has been displaced upwardly relative to the lower mold section and the cured tire has been stripped from the lower mold section as described above, the center mechanism then moves the cured tire a distance above the lower mold half. Center mechanisms of this type are well known in the art and reference is made to U.S. Pat. No. 3,260,782 for details of the construction and operation of an example thereof. The cured tire is then normally removed from the press by a suitable withdrawing device which is independently driven and controlled.

This conventional type of the press for shaping and curing tires is subject to the disadvantage of requiring separate apparatus in the form of a tire withdrawing cylinder or motor, a press drive motor, and a power source for operating the cylinder in the center mechanism. Moreover, interlocking devices are necessary to ensure safety in the press operation because of the lack of the mechanical linkage between the tire withdrawing cylinder or motor, the press drive motor, and the center mechanism which causes difficulty in achieving the synchronized timing required between tire press operation and subsequent withdrawal of the cured tire. In order to provide for the interaction of these individual devices the time interval between operation is frequently extended, thereby producing unfavorable operation of the press from the standpoint of efficiency.

SUMMARY OF THE INVENTION

A primary object of the present invention is to provide a press for shaping and curing tires incorporating a device for withdrawing a shaped and cured tire employing the power drive of the press itself, without need for installation of a separate drive device.

Another object of the present invention is to provide a press for shaping and curing tires having a device for withdrawing a shaped and cured tire which is substantially simplified in construction so that the cycle time of press operation can be appreciably reduced.

Still another object of the present invention is to provide a press for shaping and curing tires providing well synchronized timing between the cured tire withdrawing device and the components of the press itself.

A specific object is to provide a press for shaping and curing tires with a collapsible bladder and a cylinder operated center mechanism and incorporating a device for removing a cured tire from the center mechanism and subsequently discharging it from the press operated by the power drive of the press, without the necessity for an extra or independent drive mechanism.

A press for shaping and curing tires pursuant to the present invention enables a cured tire to be automatically withdrawn from the press by first being removed from its position on the center mechanism by the unloader which then discharges it outwardly of the press. The power needed to operate the device for tire removal and discharge is, according to the present invention, provided by the power drive self-contained in the press which serves primarily for controlling movement of the upper mold section relative to the stationary lower mold section through a driving mechanism usually equipped with a suitable motor, the power therefrom being normally transmitted, in part, to the upper half of the mold through a suitable crank mechanism.

The operating mode of a press according to the present invention for shaping and curing tires contemplates that the tire withdrawal device is powered by rotation of a crank mechanism driven by the press drive provided primarily for relative movement of the mold halves in the form of the motor and links associated with conventional press construction. This design eliminates the need for a separate or independent power source specifically for the tire withdrawal device as has been employed in conventional presses for shaping and curing tires. This advantage inherent in the present invention has contributed to the realization of an appreciably simplified construction of the press which in turn reduces the possibility of difficulty or failure in press operation while a reduced cost of the press as a whole is achieved. The simplified construction provides additional advantages such as the control of the upper half of a mold linked with a power source in a conventional manner, synchronized operation of the tire withdrawal device relative to the movement of the upper half of the mold, simplified interconnection between the press and unloader, reduced overall cycle time of tire shaping, curing and withdrawal, and improvement of the overall operation of the press.

Other objects and a fuller understanding of the present invention may be had by referring to the following description and claims, taken in conjunction with the accompanying drawings.

BRIEF DESCRIPTION OF THE DRAWINGS

FIG. 1 is a fragmentary front elevation view of a press according to the present invention showing particularly the press power drive components.

FIG. 2 is a schematic sectional view of the press of FIG. 1 showing the tire withdrawal device in operative relation thereto.

FIG. 5 is a schematic view, sequential to FIG. 4, of the press with the tire withdrawal device showing the withdrawal device in position under the cured tire in its suspended position.

FIG. 6 is a schematic view, sequential to FIG. 5, of the press with the tire withdrawal device showing the tire in a position raised above the center mechanism and tilted for discharge from the press by the withdrawal device.

DESCRIPTION OF THE PREFERRED EMBODIMENT

Figure 4:
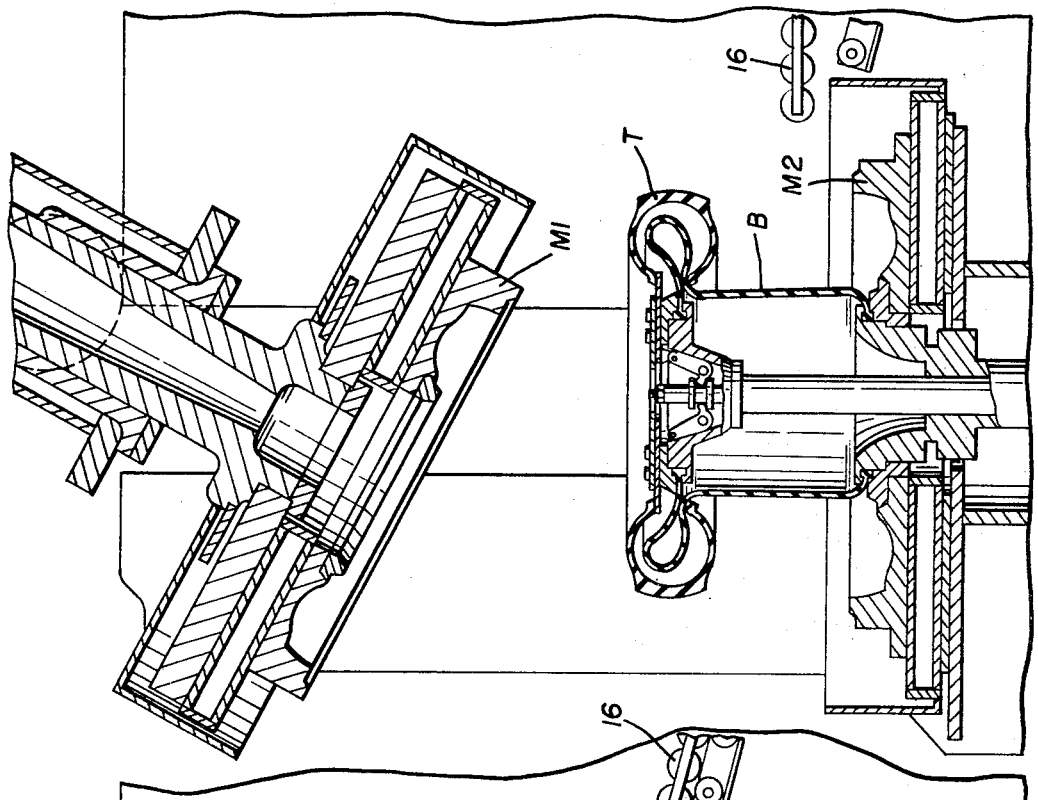
FIG. 4 is a schematic view, sequential to FIG. 3, of the press with the tire withdrawal device subsequent to press opening with the cured tire stripped from the mold sections and suspended by the bladder of the center mechanism.

Referring now to the drawings, the press drive has a crank gear 1 together with a conventional motor and suitable gear train or other comparable components which drive through the link 1' the components producing motion of the upper half of the mold M2 in the press. A pinion 2 also engages the gear 1 and by virtue of an associated clutch 3, intermittently engaged and disengaged, controllably drives a reel shaft 4, accordingly. The shaft 4 has its ends mounted in bearings (not shown) for rotation and carries a reel 5 nonrotatably keyed thereto to allow the payout and retrieval of a cable 9 having an end thereof secured to the frame 8 of the tire withdrawal device and being reeved about guide pulleys 6 and 7.

The frame 8 of the tire withdrawal device carries a plurality of cam followers 10, 11 and 12 preferably at the top, middle and bottom, respectively, as illustrated in FIG. 2. The cam followers 10, 11 and 12 are positioned to engage respective guide grooves 13, 14 and 15 machined into guide plates 17 and 17 on both sides of the press, thereby determining the path of motion of frame 8. A tire takeup arm 16 which may consist of a plurality of rolls (as shown) is secured to the frame 8 of the withdrawal device and therefore similarly follows an identical path controlled by the cam followers 10, 11 and 12. A rotary cam switch (not illustrated in the accompanying drawings) or similar device controls the clutch 3 so that when the crank gear has separated the upper mold section M1 from the lower mold section M2 a predetermined distance, the clutch 3 is engaged, whereby the pinion 2 driven by shaft 1 drives the reel 5 to retrieve cable 9 causing the takeup arm 16 to follow its predetermined path.

Figure 3:
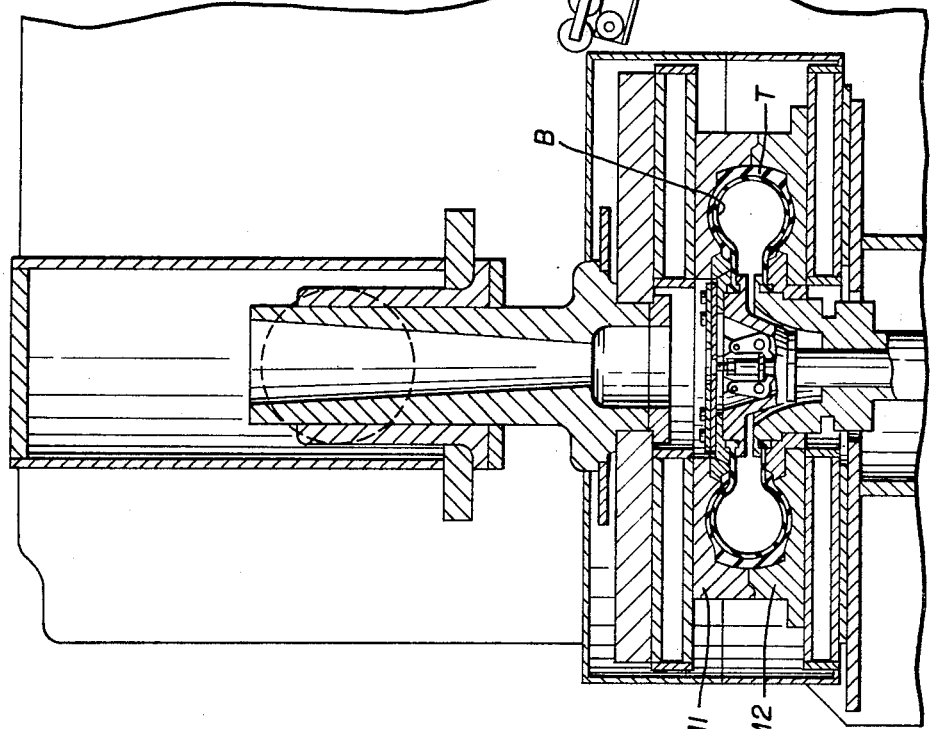
FIG. 3 is a schematic view of the press with the withdrawal device during the tire curing operation.

At the conclusion of the course of the tire shaping and curing cycle, the press according to the present invention is in a position as shown in FIG. 3, in which the two mold halves M1, M2 are closed together and the tire takeup arm 16 is positioned immediately adjacent the mold sections ready for tire unloading. At this time, the crank gear 1 commences rotation which through the motion of link 1' causes the upper mold section M1 to separate from the lower mold section M2. Subsequently, the clutch 3 engages, when the crank gear 1 has turned through a degree of rotation to allow the stripping and positioning of the cured tire, contemporaneous with the erection of the bladder. Thus, the rotation of the crank gear 1 is transmitted to the reel shaft 4 by the joint action of the pinion 2 and the clutch 3 to take up the cable 9 on reel 5 about guide pulleys 6 and 7, thereby resulting in the movement of the frame 8 carrying the takeup arm 16 in a horizontal direction under the bottom of the tire T due to the joint action of the cam followers 10, 11 and 12 in the corresponding guide grooves 13, 14 and 15. FIG. 4 shows the position of the upper mold half M1 and the cured tire T suspended on the center mechanism when the takeup arm 16 begins its horizontal movement.

Subsequently, the takeup arm 16 arrives at a position substantially under the suspended tire T at which time it commences a substantially upward vertical motion as dictated by the guide grooves 13, 14 and 15, engaging the underside of cured tire T (as seen in FIG. 5), and clearing the tire T above the center mechanism carrying the bladder B. Finally, the takeup arm 16 is sloped or inclined to the horizontal, as illustrated in FIG. 6, to discharge the tire T off the arm 16 by gravity onto a fixed conveyor C or other tire takeaway device (FIG. 5). Once the tire T has reached the discharge position of FIG. 6, the clutch 3 is disengaged resulting in the automatic return of the frame 8 and takeup arm 16 to the starting position of FIG. 3 by gravity. During this return, the cable 9 is payed out from the reel 5 on the freely rotating reel shaft 4 and frame 8 is guided by joint action of the cam followers 10, 11 and 12 engaging the corresponding guide grooves 13, 14 and 15. If desired, the gravity return of the frame 8 may be supplemented by suitable spring loading or other mechanical device in order to ensure positive return.

Although the description of the present invention has been made with the degree of particularity requisite for understanding by persons skilled in the art, it is to be understood that the present disclosure has been made only by way of example and that numerous changes in details of construction and the combination and arrangement of parts may be resorted to without departing from the spirit and scope of the invention as hereinafter claimed.

We claim:

1. In a press for shaping and curing pneumatic tires having a collapsible bladder controlled by a center mechanism and having separable mold sections, a movable upper mold section and a stationary lower mold section, a mechanism for withdrawing a cured tire from the press comprising, arm means for engaging a cured tire suspended from the center mechanism and single drive means operatively linked to the upper mold section for opening and closing the press and directly operatively linked to said arm means for removing a cured tire from the center mechanism and discharging the tire from the press.

2. Apparatus according to claim 1, wherein clutch means provides intermittent drive of said arm means.

3. Apparatus according to claim 1, wherein said arm means have attached cam means following guide means to direct the arm means substantially horizontally then substantially vertically for removing a cured tire from the center mechanism.

4. Apparatus according to claim 1, wherein said arm means is carried on frame means operatively linked to said single drive means operatively linked to the upper mold section and said arm means.

* * * * *

UNITED STATES PATENT OFFICE
CERTIFICATE OF CORRECTION

Patent No. 3,685,929                    Dated August 22, 1972

Inventor(s) Shoushi Yoshida et al.

It is certified that error appears in the above-identified patent and that said Letters Patent are hereby corrected as shown below:

On the cover sheet insert -- [73] Assignee: Kobe Steel, Ltd.

Signed and sealed this 29th day of August 1972.

(SEAL)
Attest:

EDWARD M. FLETCHER, JR.                 ROBERT GOTTSCHALK
Attesting Officer                        Commissioner of Patents